(12) United States Patent
Lee

(10) Patent No.: US 10,275,663 B2
(45) Date of Patent: Apr. 30, 2019

(54) INDOOR NAVIGATION METHOD AND SYSTEM

(71) Applicants: Passion Mobility Ltd., Taipei (TW); Chunghsin Lee, Las Vegas, NV (US)

(72) Inventor: Chunghsin Lee, Las Vegas, NV (US)

(73) Assignees: Passion Mobility Ltd., Taipei (TW); Chunghsin Lee, Las Vegas, NV (US)

( * ) Notice: Subject to any disclaimer, the term of this patent is extended or adjusted under 35 U.S.C. 154(b) by 237 days.

(21) Appl. No.: 15/592,276

(22) Filed: May 11, 2017

(65) Prior Publication Data

US 2018/0330172 A1   Nov. 15, 2018

(51) Int. Cl.

| | |
|---|---|
| *G05D 1/02* | (2006.01) |
| *G06K 9/00* | (2006.01) |
| *G06T 3/00* | (2006.01) |
| *G06T 7/73* | (2017.01) |
| *G01C 21/20* | (2006.01) |
| *G06T 7/194* | (2017.01) |
| *H04N 5/225* | (2006.01) |

(52) U.S. Cl.
CPC ....... *G06K 9/00791* (2013.01); *G01C 21/206* (2013.01); *G05D 1/0236* (2013.01); *G05D 1/0248* (2013.01); *G05D 1/0272* (2013.01); *G06T 3/0068* (2013.01); *G06T 7/194* (2017.01); *G06T 7/74* (2017.01); *H04N 5/2256* (2013.01); *G05D 2201/0213* (2013.01); *G06T 2207/20224* (2013.01); *G06T 2207/30204* (2013.01); *G06T 2207/30252* (2013.01)

(58) Field of Classification Search
CPC ............. G06K 9/00791; G06K 7/1443; H04N 5/2256; H04N 1/32224; G01C 21/206; G05D 1/0236; G05D 1/0248; G01S 5/16
See application file for complete search history.

(56) References Cited

U.S. PATENT DOCUMENTS

| | | | |
|---|---|---|---|
| 2006/0184013 A1* | 8/2006 | Emanuel ................... | G01S 5/16 600/426 |
| 2011/0010023 A1* | 1/2011 | Kunzig ..................... | G01S 5/16 701/2 |

(Continued)

*Primary Examiner* — Tracy Y. Li
(74) *Attorney, Agent, or Firm* — Alan D. Kamrath; Kamrath IP Lawfirm, P.A.

(57) ABSTRACT

An indoor navigation method is provided and includes: providing a retro-reflective marker on an upper boundary; providing an autonomous vehicle capable having a light source and an image capturing device; emitting light toward the retro-reflective marker; capturing a target image frame including at least a part of the upper boundary and the retro-reflective marker lightened; capturing a background image frame including the part of the upper boundary and the retro-reflective marker not lightened; aligning the target image frame and the background image frame by a digital image processor; subtracting the target image frame and the background image frame for extracting a foreground image indicating the position of the retro-reflective marker; adjusting the autonomous vehicle to be aligned to the retro-reflective marker according to the foreground image by a central processor installed in the autonomous vehicle; and traveling the autonomous vehicle along the retro-reflective marker according to the foreground images.

20 Claims, 9 Drawing Sheets

(56) References Cited

U.S. PATENT DOCUMENTS

2012/0051582 A1* 3/2012 Das Gupta ......... H04N 1/32224
        382/100
2013/0256416 A1* 10/2013 Wang ................... G06K 7/1443
        235/462.08

* cited by examiner

INDOOR NAVIGATION METHOD AND SYSTEM

BACKGROUND OF THE INVENTION

1. Field of Invention

The present invention relates to navigation method and system, and more particularly to navigation method and system applicable to indoor usage.

2. Description of the Related Art

Autonomous vehicle technologies have advanced greatly in recent years. Many big Internet companies and most of the big car companies have allocated large resources to develop autonomous vehicle technologies to enable a driverless car to travel on public road at highway speed. Many navigation methods have been applied, in which most of them use global positioning system (GPS) combining a detailed local map to determine the track to travel.

For autonomous vehicle traveling in the indoor environment, some kind of navigation method is required. Because the satellite GPS systems do not work well or at all under indoor situation, many schemes are devised to facilitate this purpose. To reduce the vehicle cost and infrastructure buildup, it is necessary to develop new navigation systems for an autonomous vehicle, i.e. a navigation method and system that does not require expensive sensors on the vehicles and requires very little infrastructure setup that can be applied to indoor usages is strongly demanded.

SUMMARY OF THE INVENTION

An aspect of the present invention is to provide an indoor navigation method comprising: providing an upper boundary; providing a retro-reflective marker on the upper boundary; providing an autonomous vehicle capable of being traveled under the upper boundary and having a light source and an image capturing device disposed thereon; emitting light toward the retro-reflective marker from the light source disposed on the autonomous vehicle; capturing a target image frame including at least a part of the upper boundary and the retro-reflective marker lightened by the light emitted from the light source by the image capturing device; turning off the light source and capturing a background image frame including the part of the upper boundary and the retro-reflective marker not lightened by the light emitted from the light source by the image capturing device; aligning the target image frame and the background image frame by a digital image processor installed in the autonomous vehicle; subtracting the target image frame and the background image frame for extracting a foreground image indicating the position of the retro-reflective marker by the digital image processor; adjusting the autonomous vehicle relative to the retro-reflective marker according to the foreground image by a central processor installed in the autonomous vehicle; and traveling the autonomous vehicle along the retro-reflective marker according to the foreground images.

According to an embodiment of the indoor navigation method of the present invention, the autonomous vehicle is adjusted to be aligned with the retro-reflective marker according to the foreground image by a central processor installed in the autonomous vehicle.

According to an embodiment of the indoor navigation method of the present invention, the number of the retro-reflective marker is plural, the plurality of retro-reflective markers are grouped into a plurality of station patterns and a plurality of route patterns, each of the station patterns is connected to one another via one of the route patterns.

According to an embodiment of the indoor navigation method of the present invention, each of the station patterns is in a geometrical shape, and each of the route patterns is in a linear shape, the digital image processor determines whether the foreground image is in the geometrical shape or the linear shape in order to determine whether the autonomous vehicle is traveling under the station patterns or the route patterns.

According to an embodiment of the indoor navigation method of the present invention, the aforementioned method further comprises: positioning the autonomous vehicle under one of the station patterns prior to traveling the autonomous vehicle.

According to an embodiment of the indoor navigation method of the present invention, the autonomous vehicle is traveled between two of the station patterns along one of the route patterns connected in between the two stations.

According to an embodiment of the indoor navigation method of the present invention, the method further comprises recording the distance the autonomous vehicle has traveled by an odometer device.

According to an embodiment of the indoor navigation method of the present invention, the image capturing device continuously captures a plurality of the target image frames and a plurality of the background image frames in interval as the light source turns on and off while the autonomous vehicle travels, and the digital image processor aligns and extracts one of the target image frames and the background image frames subsequently captured to continuously obtain a plurality of the foreground images.

According to an embodiment of the indoor navigation method of the present invention, the method further comprises: providing a map including the plurality of station patterns and the plurality of route patterns; designating one of the station pattern on the map where the autonomous vehicle is to be traveled to; and traveling the autonomous vehicle to the designated station pattern along the plurality of route patterns according to the plurality of foreground images.

According to an embodiment of the indoor navigation method of the present invention, the method further comprises: determining the position of the autonomous vehicle according to the distance traveled recorded by the odometer device and the number of the station patterns passed according to the plurality of foreground images.

Another aspect of the present invention is to provide an indoor navigation system for navigating an autonomous vehicle under an upper boundary, the indoor navigation system comprises: the autonomous vehicle; the upper boundary; a retro-reflective marker disposed on the upper boundary, the autonomous vehicle comprises: a light source installed on the autonomous vehicle and capable of emitting light toward the retro-reflective marker; an image capturing device installed on the autonomous vehicle and configured to capture a target image frame and a background image frame, wherein the target image includes at least a part of the upper boundary and the retro-reflective marker lightened by the light emitted from the light source by the image capturing device, and the background image frame includes the part of the upper boundary and the retro-reflective marker not lightened by the light emitted from the light source by the image capturing device; a digital image processor connected to the image capturing device for processing alignment of the target image frame and the background image frame, and subtracting the target image frame and the background image frame for extracting a foreground image indicating the position of the retro-reflective marker; a central processor connected to the digital image processor and the light source for turning on or off the light source and adjusting the autonomous vehicle relative to the retro-reflective marker according to the foreground image.

According to an embodiment of the indoor navigation system of the present invention, the autonomous vehicle is adjusted to be aligned with the retro-reflective marker according to the foreground image by a central processor installed in the autonomous vehicle.

According to an embodiment of the indoor navigation system of the present invention, the number of the retro-reflective marker is plural, and the plurality of retro-reflective markers are grouped into a plurality of station patterns and a plurality of route patterns, each of the station patterns is connected to one another via one of the route patterns.

According to an embodiment of the indoor navigation system of the present invention, each of the station patterns is in a geometrical shape, and each of the route patterns is in a linear shape, the digital image processor determines whether the foreground image is in the geometrical shape or the linear shape in order to determine whether the autonomous vehicle is traveling under the station patterns or the route patterns.

According to an embodiment of the indoor navigation system of the present invention, one of the station patterns is a starting position where the autonomous vehicle is to be started to travel.

According to an embodiment of the indoor navigation system of the present invention, the central processor drives the autonomous vehicle to be traveled between two of the station patterns along one of the route patterns connected in between the two stations.

According to an embodiment of the indoor navigation system of the present invention, the system further comprises: an odometer device connected to the central processor and is configured to record the distance the autonomous vehicle has traveled.

According to an embodiment of the indoor navigation system of the present invention, the image capturing device is configured to continuously capture a plurality of the target image frames and a plurality of the background image frames in interval as the light source turns on and off while the autonomous vehicle travels, and the digital image processor is configured to align and extract one of the target image frames and the background image frames subsequently captured to continuously obtain a plurality of the foreground images.

According to an embodiment of the indoor navigation system of the present invention, the system further comprises: a memory unit connected to the central processor; and a map installed in the memory unit and including the plurality of station patterns and the plurality of route patterns, wherein when one of the station pattern on the map has been designated where the autonomous vehicle is to be traveled to, the central processor drives the autonomous vehicle to be traveled to the designated station pattern along the plurality of route patterns according to the plurality of foreground images.

According to an embodiment of the indoor navigation system of the present invention, the central processor is configured to calculate the position of the autonomous vehicle according to the distance traveled recorded by the odometer device and the number of the station patterns passed according to the plurality of foreground images.

Another aspect of the present invention is to provide an indoor positioning method for positioning an autonomous vehicle traveling under an upper boundary, comprising: providing a plurality of geometrical patterns and a plurality of linear patterns connected in between each two of the plurality of the geometrical patterns on the upper boundary, wherein each of the geometrical patterns and linear patterns are formed of retro-reflective markers; providing a map installed in a memory unit disposed in the autonomous vehicle, wherein the map includes position info of the geometrical patterns and the linear patterns; emitting light upright from a light source disposed on the autonomous vehicle toward at least one of the geometrical patterns and at least one of the linear patterns; capturing a target image frame including the upper boundary, the at least one of the geometrical patterns, and the at least one of the linear patterns lightened by the light emitted from the light source by an image capturing device installed in the autonomous vehicle; turning off the light source and capturing a background image frame including the upper boundary, the at least one of the geometrical patterns, and the at least one of the linear patterns not lightened by the light emitted from the light source by the image capturing device; aligning the target image frame and the background image frame by a digital image processor installed in the autonomous vehicle; subtracting the target image frame and the background image frame for extracting a foreground image indicating the at least one of the geometrical patterns and the at least one of the linear patterns by the digital image processor; and determining the position of the autonomous vehicle by comparing the at least one of the geometrical patterns and the at least one of the linear patterns to the position info of the map by a central processor.

According to an embodiment of the indoor positioning method, the method further comprises: determining a signal-to-noise ratio of the foreground image by the image capturing device, and when the signal-to-noise ratio is lower than a predetermined threshold, re-capturing the target image frame and the background image frame.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE INVENTION

Figure 1:
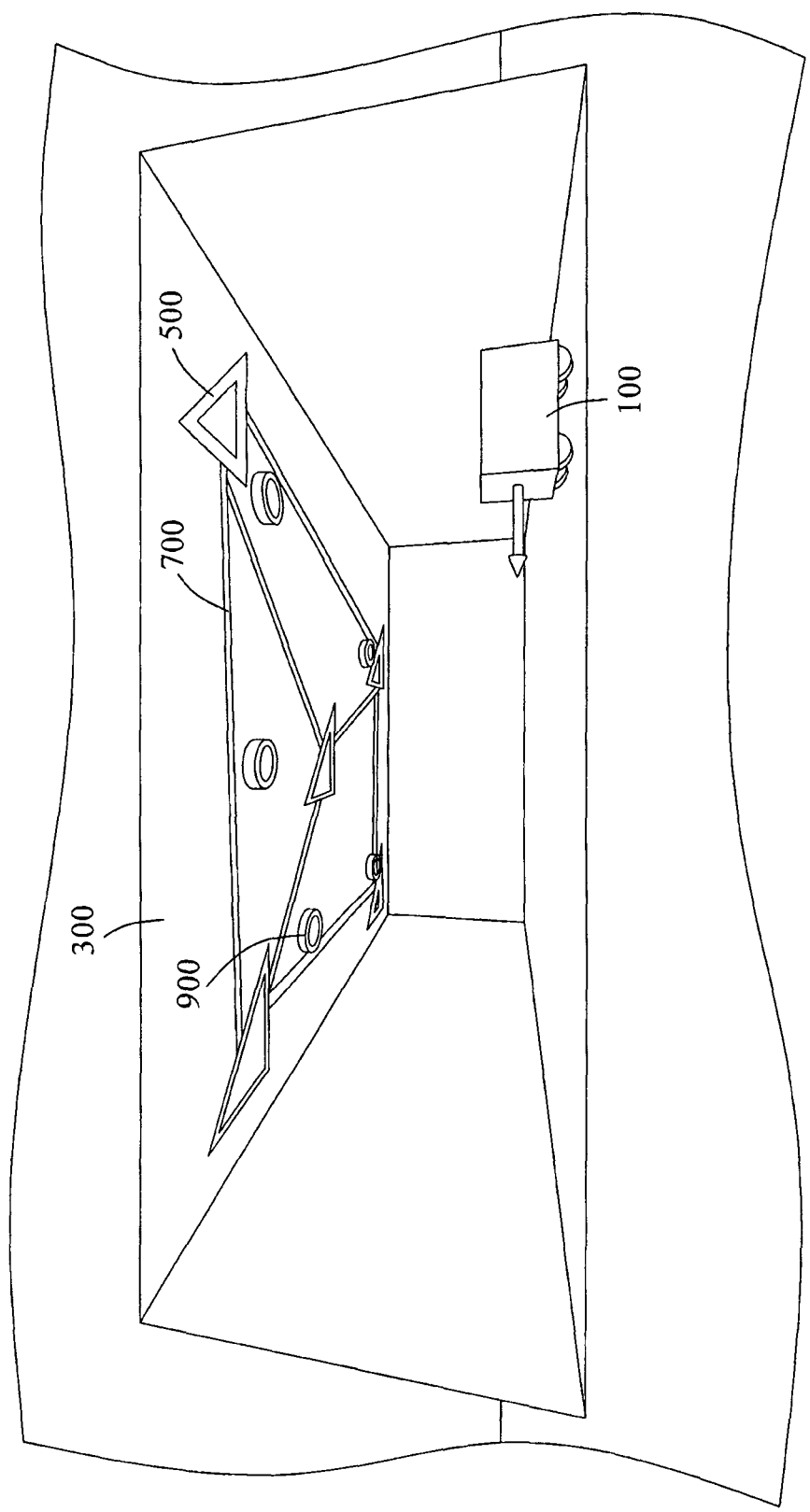
FIG. 1 is a schematic diagram illustrating a navigation system for an autonomous vehicle according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method or the system by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that when an element is referred to as being "connected" to another element, it can be directly connected to the other element or intervening elements may be present.

FIG. 1 is a schematic diagram illustrating a navigation system for an autonomous vehicle 100 according to an embodiment of the present invention. The navigation system includes the autonomous vehicle 100, an upper boundary 300, a number of station patterns 500, a number of route patterns 700, and a number of illuminating units 900. Since the system is to be used in an indoor environment, the upper boundary 300 may be a ceiling. The station patterns 500 and the route patterns 700 are markers labeled or disposed on the upper boundary 300. Further, the station patterns 500 and the route patterns 700 are formed of a number of retro-reflective markers, and each of the station patterns 500 is connected to one another via one of the route patterns 700. Each of the station patterns 500 is formed in a geometrical shape by clusters of the retro-reflective markers, such as a right-angled triangle, a circle, or a rectangle. Each of the route patterns is in a linear shape, typically a line. The illuminating units 900 are for illuminating the indoor environment. The autonomous vehicle 100 is capable of being positioned or traveled under the upper boundary 300 by referencing the station patterns 500 and the route patterns 700. The autonomous vehicle 100 may be navigated from one station pattern 500, designated as a starting position where the autonomous vehicle is to be started to travel, to one another along the route patterns 700 by detecting those retro-reflective markers.

Figure 2:
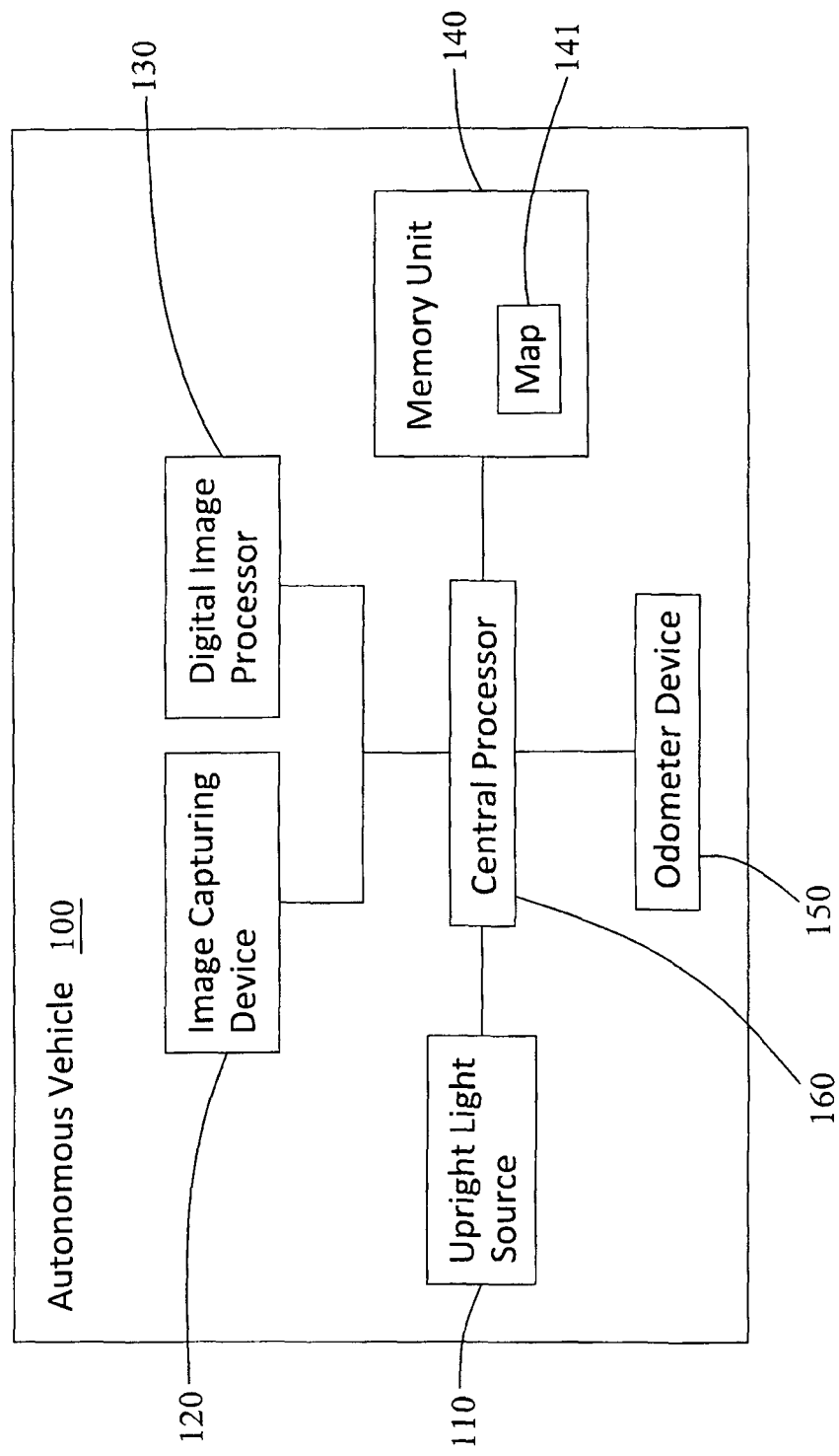
FIG. 2 is a functional block diagram illustrating the autonomous vehicle according to an embodiment of the present invention.

FIG. 2 is a functional block diagram illustrating the autonomous vehicle 100 according to an embodiment of the present invention. The autonomous vehicle 100 includes a light source 110, an image capturing device 120, a digital image processor 130, a memory unit 140, a odometer device 150, and a central processor 160.

The light source 110 is installed on the autonomous vehicle 100 and connected to the central processor 160. In a preferred embodiment, the light source 110 is installed on the roof of the autonomous vehicle 100. In some embodiments, the light source 110 can be positioned upright so as to be capable of emitting light toward the retro-reflective markers, namely the station patterns 500 and the route patterns 700, thereby the station patterns 500 and the route patterns 700 illuminated by the light source 110 reflect light back in the direction it came. The light source 110 may be turned on and off in interval by the central processor 160.

The image capturing device 120 may be a camera and is installed on the autonomous vehicle 100. The image capturing device 120 is configured to capture a target image frame and a background image frame. The target image frame is captured by the image capturing device 120 while the light source 110 is turned on by the central processor 160. The target image frame includes at least a part of the upper boundary 300 and the lightened station patterns 500, the route patterns 700, or the both. The background image frame includes at least a part of the upper boundary 300 and the station patterns 500, the route patterns 700, or the both that are not lightened by the light emitted from the light source while the light source 110 is turned off by the central processor 160. Additionally, the image capturing device 120 is connected to and controlled by the central processor 160 to be continuously capturing a number of the target image frames and a number of the background image frames in interval as the central processor 160 turns on and off the light source 120 while the autonomous vehicle 100 travels.

The digital image processor 130 is connected to both the image capturing device 120 and the central processor 160. The digital image processor 130 is capable of processing alignments of the target image frames and the background image frames, and subsequently subtracting the target image frame and the background image frame subsequently captured right after the light source 110 is turned off, for continuously extracting a number of foreground images indicating the position of the retro-reflective markers, i.e. the station patterns 500, the route patterns 700 or the both, while the autonomous vehicle 100 travels. The digital image processor 130 determines the shapes (patterns) of the foreground image extracted in order to determine whether the autonomous vehicle 100 is traveling under the station patterns 500 or the route patterns 700. The odometer device 150 is connected to the central processor 160 and is configured to record the distance the autonomous vehicle 100 has traveled.

The memory unit 140 is connected to the central processor 160, in which a map 141 is installed in the memory unit 140. The map 141 includes info of the station patterns 500 and the route patterns 700 such as their positions within the upper boundary 300. For instance, users taking the autonomous vehicle 100 may designate a destination (one of the station patterns 500) on the map 141, and the central processor 160 will trigger the autonomous vehicle 100 to drive to the designated station pattern 500 along the route patterns 700 by referencing the foreground images continuously extracted.

The central processor 160 is also capable of adjusting the autonomous vehicle 100 relative to the retro-reflective marker according to the foreground images, and calculating the position of the autonomous vehicle 100 according to the distance traveled recorded by the odometer device 150 and the number of the station patterns 500 passed according to the foreground images. In some embodiments, the central processor 160 is capable of adjusting the autonomous vehicle 100 to be aligned or moved relative to the retro-reflective marker according to such foreground images.

Figure 3:
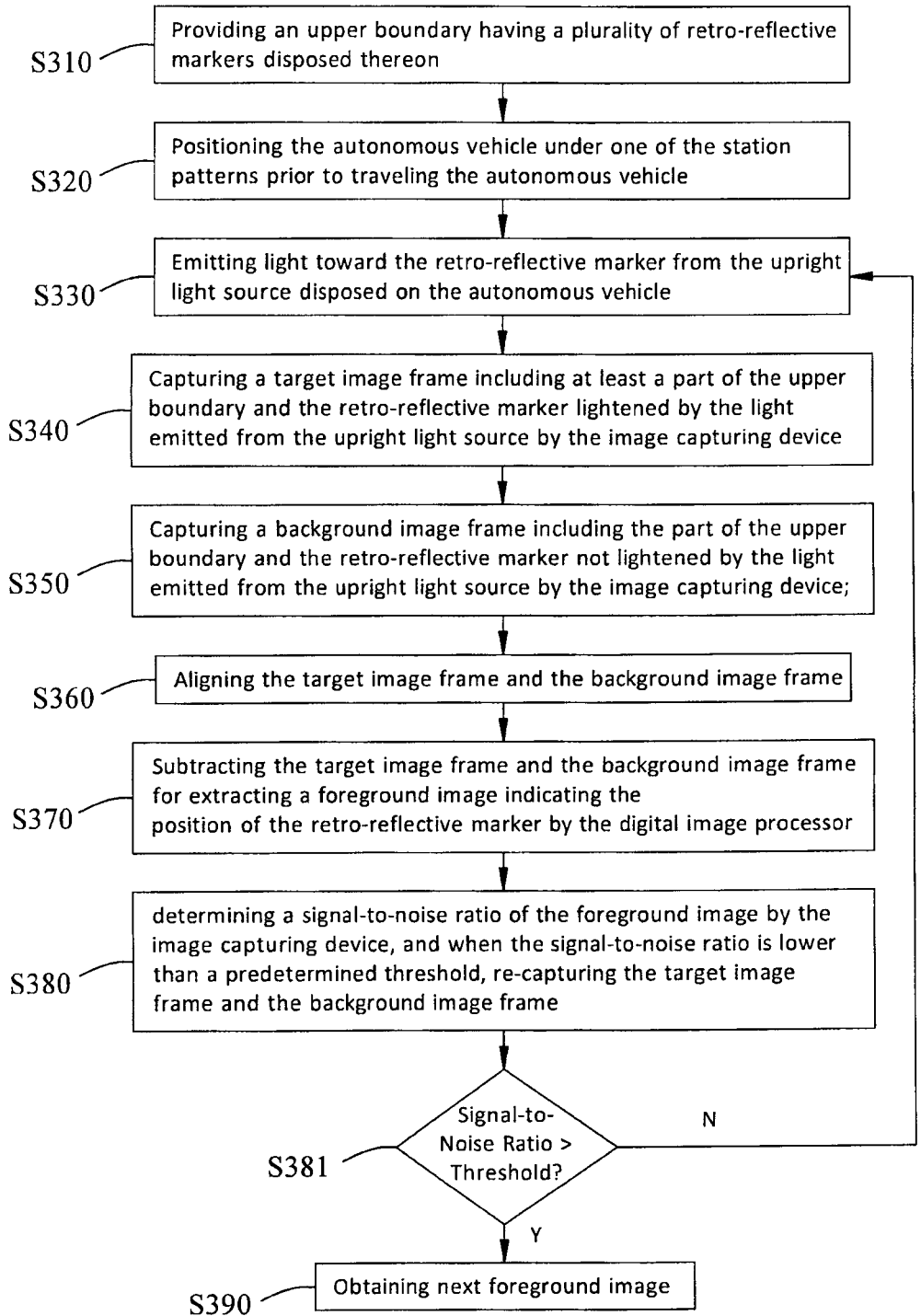
FIG. 3 is a flow chart illustrating the method of obtaining the foreground images according to an embodiment of the present invention.
Figure 5A:
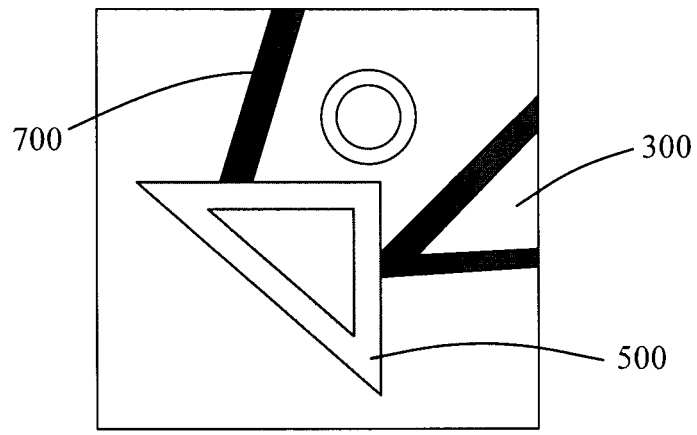
FIG. 5A is an exemplary schematic diagram of a target image frame according to an embodiment of the present invention.
Figure 5B:
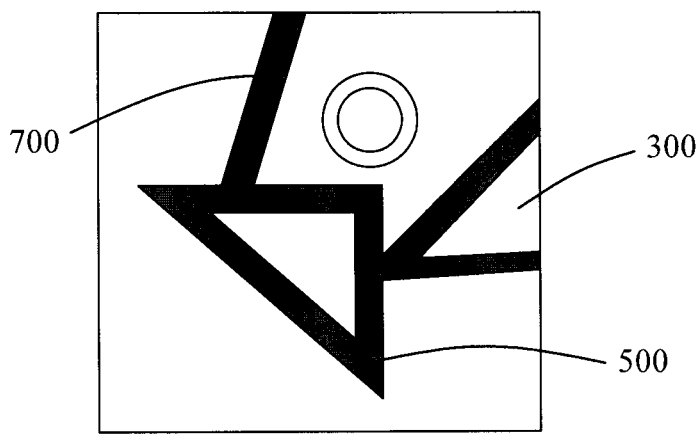
FIG. 5B is an exemplary schematic diagram of a background image frame according to an embodiment of the present invention.
Figure 5C:
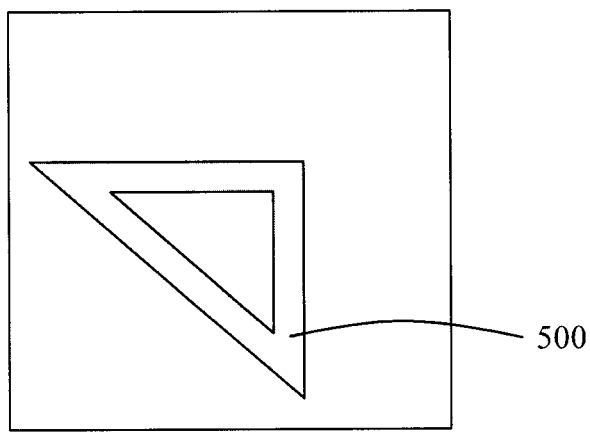
FIG. 5C is an exemplary schematic diagram of a foreground image extracted by the target image frame and the background image frame depicted in FIGS. 5A and 5B according to an embodiment of the present invention.

FIG. 3 is a flow chart illustrating the method of obtaining the foreground images according to an embodiment of the present invention. While the autonomous vehicle 100 is being navigated and traveled, the aforementioned foreground images are to be obtained in order to designate a destination (one of the station patterns 500) to travel, and to keep on a predetermined route, namely to keep the autonomous vehicle 100 travel along the route patterns 700, or, alternatively, to determine the position of the autonomous vehicle 100 in order to assign a station pattern that the autonomous vehicle 100 is about to travel. Referring to FIG. 3, in step S310, an environment for indoor navigation has to be set up first, therefore the upper boundary 300 such as a ceiling, and the station patterns 500 and the route patterns 700 formed of numerous retro-reflective markers disposed on the upper boundary 300 are provided at the very beginning. Meanwhile, in step S320, the autonomous vehicle 100 also has to be placed under a starting point first, in which the starting point is one of the station patterns 500 disposed on the upper boundary 300. While such preparations are completed, in step S330, the light source 110 emits light beams toward the upper boundary 300, which has the retro-reflective markers disposed on. While the autonomous vehicle 100 is located under one of the station patterns 500, the light beams of the light source. 110 are traveled to the station patterns 500 and reflected, and as the autonomous vehicle 100 travels further along the route patterns 700, the light beams of the light source 110 travels and bounces back from the route patterns 700, and so on. In step S340, the reflected light beams are received by the image capturing device 120 as the target image frame and will be temporarily stored in the digital image processor 130. The target image frame includes at least a part of the upper boundary 300 and the retro-reflective markers lightened by the light emitted from the light source 110 (see FIG. 5A). Then, in step S350, after the target image frame is received, the central processor 160 turns off the light source 110 for capturing the background image frame, which will be temporarily stored in the digital image processor 130 as well. The background image frame includes the part of the upper boundary 300 and the retro-reflective marker not lightened by the light emitted from the light source 110, and various background noises such as the lights from the illuminating units 900 (see FIG. 5B). While both the target image frame and the background image frame are captured, in step S360, the digital image processor 130 aligns them both in case of possible frame shifts due to motions of the autonomous vehicle 100. Next, in step S370, the target image frame and the background image frame are subtracted to obtain a foreground image of, theoretically, only the outline of the retro-reflective markers are shown (see FIG. 5C). In practice, noises may be existing in the foreground image obtained, so in step S380, signal-to-noise ratio will be calculated, and if the signal-to-noise ratio cannot reach a predetermined threshold, the foreground image capturing steps will have to be gone through all over again and go back to S330. If the signal-to-noise ratio reaches the predetermined threshold, step S390 will be performed, that is, to obtain the next foreground image. The aforementioned steps will be continuously performed until the navigation is no more needed; for instance, when the autonomous vehicle 100 has reached its destination. By performing through the above steps, the autonomous vehicle 100 may be navigated under the station patterns 500 and along the route patterns 700 by referencing the foreground images obtained.

Figure 4:
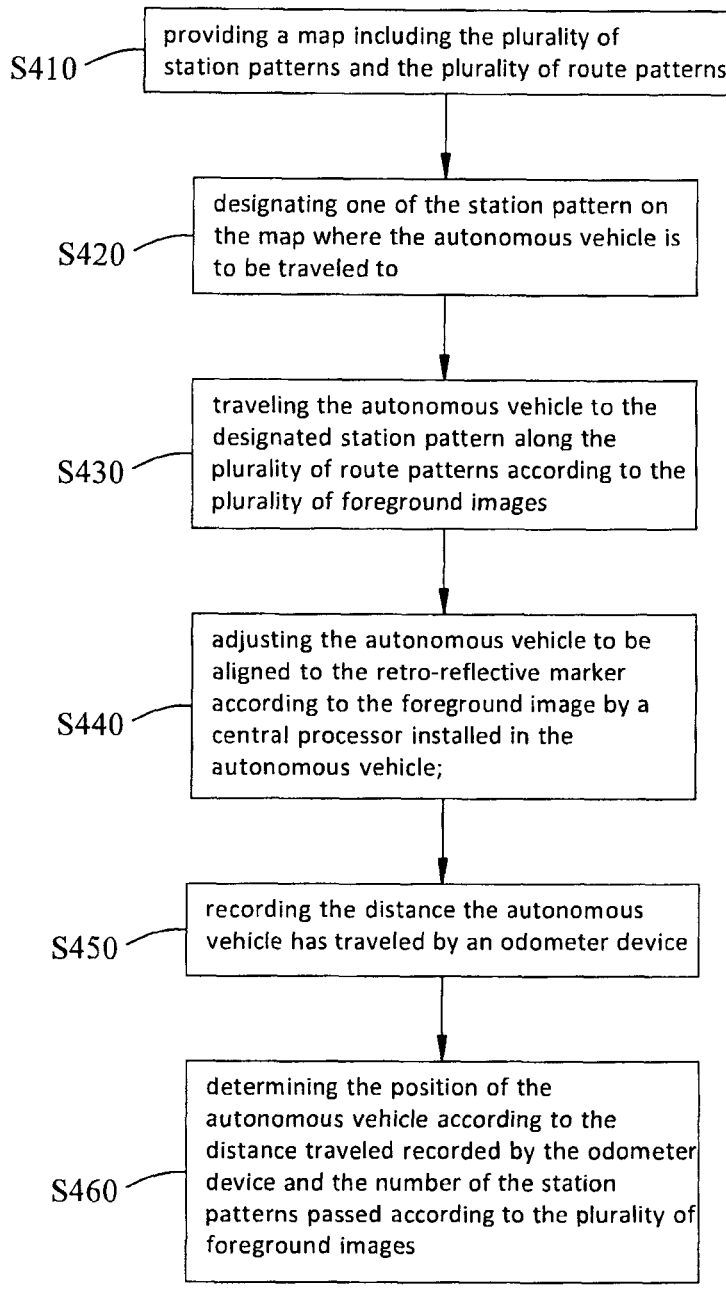
FIG. 4 is a flow chart illustrating a navigation method using the foreground images obtained according to an embodiment of the present invention.
Figure 6:
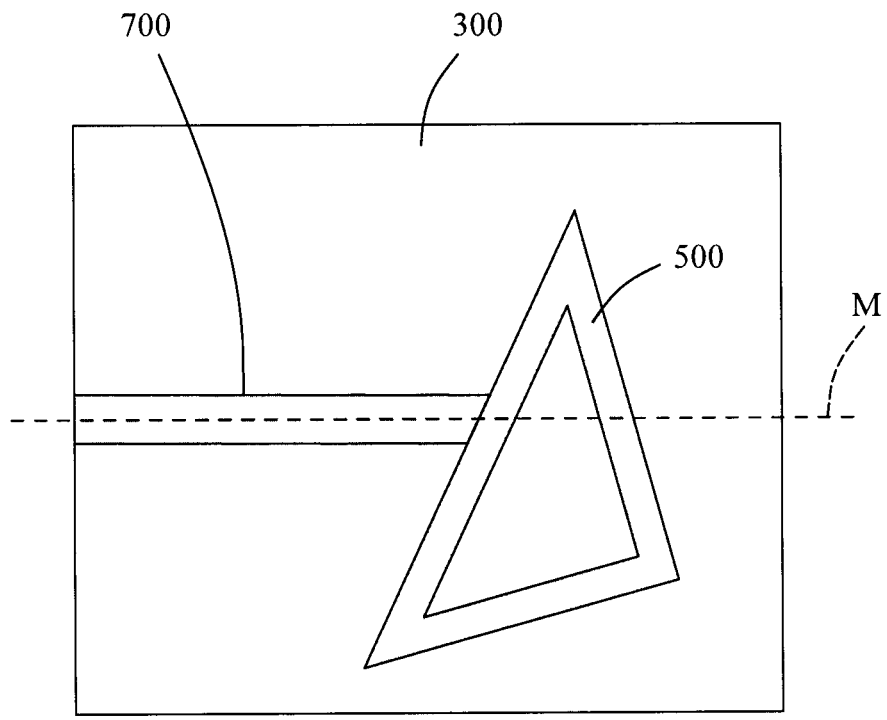
FIG. 6 is an exemplary schematic diagram of a foreground image having a middle line aligned with a route pattern according to an embodiment of the present invention.
Figure 7A:
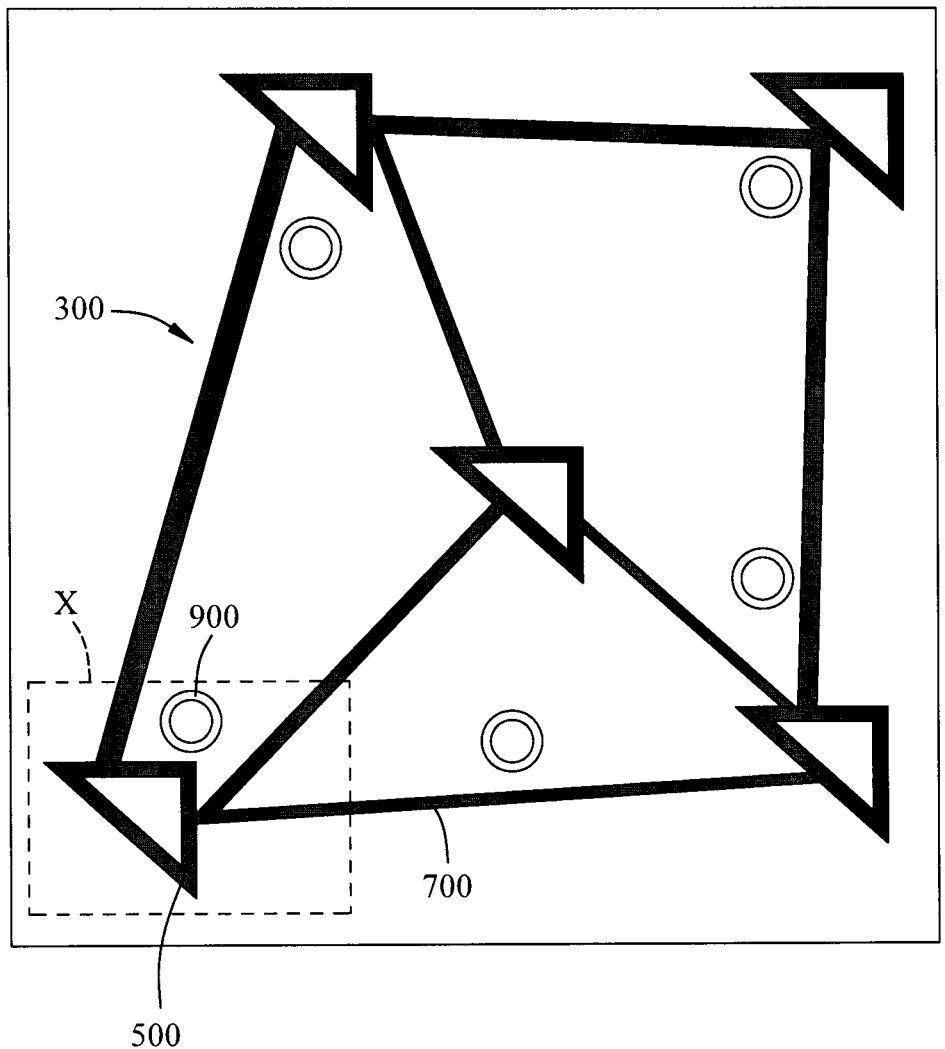
FIG. 7A is a schematic diagram of the upper boundary indicating an area to be captured and processed as a foreground image according to an embodiment of the present invention.
Figure 7B:
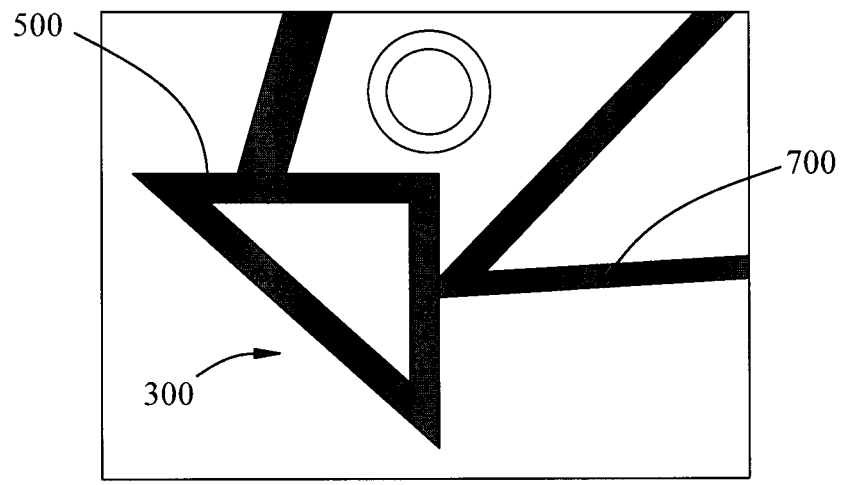
FIG. 7B is a schematic diagram of the area indicated in FIG. 7A enlarged according to an embodiment of the present invention.
Figure 7C:
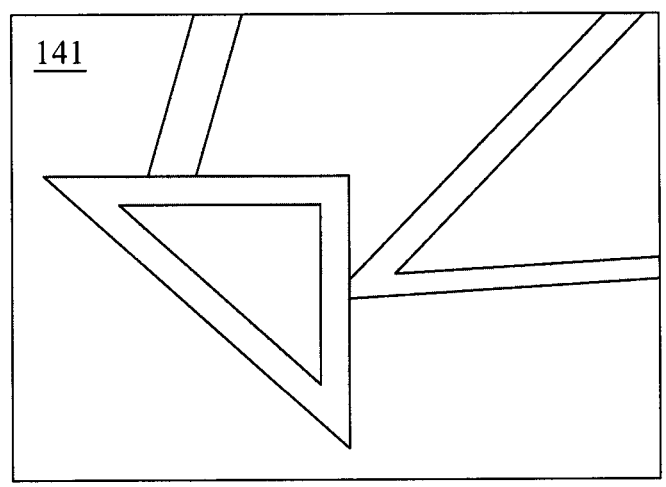
FIG. 7C is a schematic diagram of a part of a map showing the corresponding area depicted in 7A and 7B having retro-reflective markers arranged in the same shape.

FIG. 4 is a flow chart illustrating a navigation method using the foreground images obtained according to an embodiment of the present invention. Firstly, in step S410, the map 141 is installed in the memory unit 140 connected to the central processor 160. The map 141 includes position information of each station pattern 500 and each route pattern 700. While users are desired to reach a destination by taking the autonomous vehicle 100, step S420 is performed, in which the destination is designated on the map 141 as one of the station patterns 700. It is worth to be mentioned that more than one station patterns may be designated in which one of those are the final destination and the others are where the autonomous vehicle 100 is to be passed by. Then, in step S430, the autonomous vehicle 100 will head to the destination designated according to the foreground images. In some embodiments, as the autonomous vehicle 100 travels, it may be accidentally off-tracked, in this instance step S440 will be performed. The central unit 160 will slightly adjust the moving path of the autonomous vehicle 100 to continuously keep the autonomous vehicle 100 on track according to the foreground images. There are various manners to adjust the moving path of the autonomous vehicle 100, such as, referring to FIG. 6 as an instance of a foreground image, one of the station patterns 500 and a part of the route patterns 700 are shown, and since the route patterns 700 are linear, it may be aligned with the middle line M of the foreground image. The central processor 160 may adjust the autonomous vehicle 100 according to the deviation value of the route pattern 700. The distance traveled may, optionally, be recorded in the odometer device 150 (step S450), and, in step S460, the position of the autonomous vehicle 100 can be determined according to the number of the station patterns counted previously with referencing the foreground images and the map 141. Alternatively, referring to FIG. 7A to FIG. 7C, the position of the autonomous vehicle 100 may also be determined merely by comparing the foreground image with the position information of the map 141. To be more specific, FIG. 7A is a schematic diagram of the upper boundary 300 indicating an area X to be captured and processed as a foreground image according to an embodiment of the present invention. FIG. 7B is a schematic diagram of the area X indicated in FIG. 7A enlarged according to an embodiment of the present invention. FIG. 7C is a schematic diagram of a part of a map showing the same area X depicted in 7A and 7B having retro-reflective markers arranged in the same shape. By comparing the pattern or shape, of the area X with the corresponding location in the map 141, the instant position of the autonomous vehicle 100 can be determined. In some embodiments, the autonomous vehicle 100 may not only be "tracked along" the route patterns, but be traveled along a virtual route generated according to its instant position and a designated station pattern in the map 141. For instance, the virtual route may be a straight line from the instant position to the designated station pattern, or an irregular line to the designated station pattern in order to bypass a predetermined location. In general, the autonomous vehicle 100 of the present invention may be traveled along a route from station pattern A to station pattern B while the instant position has been determined, in which such route may be generated by the central processor 160 in various algorithms.

Figure 8:
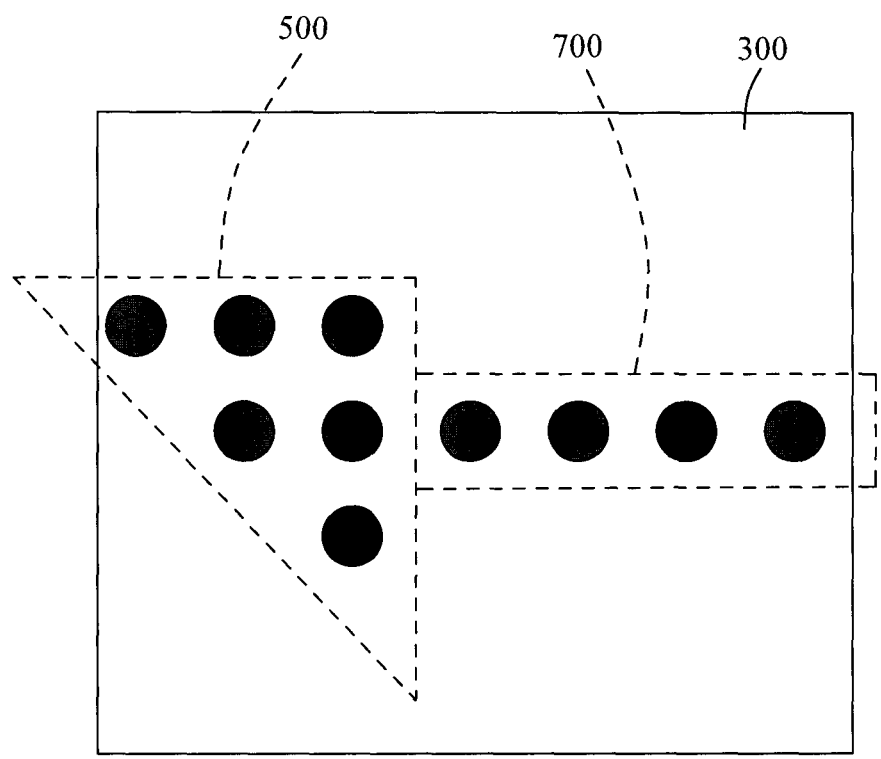
FIG. 8 is an exemplary schematic diagram showing another type of retro-reflective marker according to an embodiment of the present invention.

In some embodiments, despite that the station patterns 500 and the route patterns 700 shown in the previously depicted figures are formed of continuous lines, the station patterns 500 and the route patterns 700 may also be formed with a group of individual spherical-shaped retro-reflective markers (see FIG. 8).

It is worth noting that one significant advantage of the present invention is that once the autonomous vehicle has been placed under the upper boundary within the same region of the scope of the map, it may be positioned by referring to the foreground image which shows specific patterns formed with retro-reflective markers. The autonomous vehicle may then be traveled to a designated position corresponding to a specific shape formed by the retro-reflective markers in the map, in which the route to be traveled along may not only be the following the route patterns mentioned above, but be traveled along a virtual route as determined by the central processor from the position of the autonomous vehicle to that designated position, which is the designated destination where the passenger is desired to be traveled to.

The description of the invention including its applications and advantages as set forth herein is illustrative and is not intended to limit the scope of the invention, which is set forth in the claims. Variations and modifications of the embodiments disclosed herein are possible, and practical alternatives to and equivalents of the various elements of the embodiments would be understood to those of ordinary skill in the art upon study of this patent document. For example, specific values given herein are illustrative unless identified as being otherwise, and may be varied as a matter of design consideration. Terms such as "target" and "background" or so are distinguishing terms and are not to be construed to imply an order or a specific part of the whole. These and other variations and modifications of the embodiments disclosed herein, including of the alternatives and equivalents of the various elements of the embodiments, may be made without departing from the scope and spirit of the invention, including the invention as set forth in the following claims.

What is claim is:

1. An indoor navigation method, comprising:
providing an upper boundary;
providing a retro-reflective marker on the upper boundary;
providing an autonomous vehicle capable of being traveled under the upper boundary and having a light source and an image capturing device disposed thereon;
emitting light toward the retro-reflective marker from the light source disposed on the autonomous vehicle;
capturing a target image frame including at least a part of the upper boundary and the retro-reflective marker lightened by the light emitted from the light source by the image capturing device;
turning off the light source and capturing a background image frame including the part of the upper boundary and the retro-reflective marker not lightened by the light emitted from the light source by the image capturing device;
aligning the target image frame and the background image frame by a digital image processor installed in the autonomous vehicle;
subtracting the target image frame and the background image frame for extracting a foreground image indicating the position of the retro-reflective marker by the digital image processor;
adjusting the autonomous vehicle relative to the retro-reflective marker according to the foreground image by a central processor installed in the autonomous vehicle; and
traveling the autonomous vehicle along the retro-reflective marker according to the foreground images.

2. The indoor navigation method as claimed in claim 1, wherein the autonomous vehicle is adjusted to be aligned with the retro-reflective marker according to the foreground image by a central processor installed in the autonomous vehicle.

3. The indoor navigation method as claimed in claim 1, wherein the number of the retro-reflective marker is plural, the plurality of retro-reflective markers are grouped into a plurality of station patterns and a plurality of route patterns, each of the station patterns is connected to one another via one of the route patterns.

4. The indoor navigation method as claimed in claim 3, wherein each of the station patterns is in a geometrical shape, and each of the route patterns is in a linear shape, the digital image processor determines whether the foreground image is in the geometrical shape or the linear shape in order to determine whether the autonomous vehicle is traveling under the station patterns or the route patterns.

5. The indoor navigation method as claimed in claim 3, further comprising:
positioning the autonomous vehicle under one of the station patterns prior to traveling the autonomous vehicle.

6. The indoor navigation method as claimed in claim 4, wherein the autonomous vehicle is traveled between two of the station patterns along one of the route patterns connected in between the two stations.

7. The indoor navigation method as claimed in claim 4, wherein the image capturing device continuously captures a plurality of the target image frames and a plurality of the background image frames in interval as the light source turns on and off while the autonomous vehicle travels, and the digital image processor aligns and extracts one of the target image frames and the background image frames subsequently captured to continuously obtain a plurality of the foreground images.

8. The indoor navigation method as claimed in claim 7, further comprising:
providing a map including the plurality of station patterns and the plurality of route patterns;
designating one of the station pattern on the map where the autonomous vehicle is to be traveled to; and
traveling the autonomous vehicle to the designated station pattern along the plurality of route patterns according to the plurality of foreground images.

9. The indoor navigation method as claimed in claim 6, further comprising determining the position of the autonomous vehicle according to the distance traveled recorded by the odometer device and the number of the station patterns passed according to the plurality of foreground images.

10. An indoor navigation system for navigating autonomous vehicle, the indoor navigation system comprising:

an autonomous vehicle located under an upper boundary having a retro-reflective marker disposed thereon, the autonomous vehicle comprising:
- a light source installed on the autonomous vehicle and capable of emitting light toward the retro-reflective marker;
- an image capturing device installed on the autonomous vehicle and configured to capture a target image frame and a background image frame, wherein the target image includes at least a part of the upper boundary and the retro-reflective marker lightened by the light emitted from the light source by the image capturing device, and the background image frame includes the part of the upper boundary and the retro-reflective marker not lightened by the light emitted from the light source by the image capturing device;
- a digital image processor connected to the image capturing device for processing alignment of the target image frame and the background image frame, and subtracting the target image frame and the background image frame for extracting a foreground image indicating the position of the retro-reflective marker;
- a central processor connected to the digital image processor and the light source for turning on or off the light source and adjusting the autonomous vehicle to be aligned to the retro-reflective marker according to the foreground image.

11. The indoor navigation system as claimed in claim 10, wherein the number of the retro-reflective marker is plural, and the plurality of retro-reflective markers are grouped into a plurality of station patterns and a plurality of route patterns, each of the station patterns is connected to one another via one of the route patterns.

12. The indoor navigation system as claimed in claim 11, wherein each of the station patterns is in a geometrical shape, and each of the route patterns is in a linear shape, the digital image processor determines whether the foreground image is in the geometrical shape or the linear shape in order to determine whether the autonomous vehicle is traveling under the station patterns or the route patterns.

13. The indoor navigation system as claimed in claim 12, wherein one of the station patterns is a starting position where the autonomous vehicle is to be started to travel.

14. The indoor navigation system as claimed in claim 13, wherein the central processor drives the autonomous vehicle to be traveled between two of the station patterns along one of the route patterns connected in between the two stations.

15. The indoor navigation system as claimed in claim 13, further comprising: an odometer device connected to the central processor and is configured to record the distance the autonomous vehicle has traveled.

16. The indoor navigation system as claimed in claim 13, wherein the image capturing device is configured to continuously capture a plurality of the target image frames and a plurality of the background image frames in interval as the light source turns on and off while the autonomous vehicle travels, and the digital image processor is configured to align and extract one of the target image frames and the background image frames subsequently captured to continuously obtain a plurality of the foreground images.

17. The indoor navigation system as claimed in claim 16, further comprising:
- a memory unit connected to the central processor; and
- a map installed in the memory unit and including the plurality of station patterns and the plurality of route patterns, wherein when one of the station pattern on the map has been designated where the autonomous vehicle is to be traveled to, the central processor drives the autonomous vehicle to be traveled to the designated station pattern along the plurality of route patterns according to the plurality of foreground images.

18. The indoor navigation system as claimed in claim 17, wherein the central processor is configured to calculate the position of the autonomous vehicle according to the distance traveled recorded by the odometer device and the number of the station patterns passed according to the plurality of foreground images.

19. An indoor positioning method for positioning an autonomous vehicle traveling under an upper boundary, comprising:
- providing a plurality of geometrical patterns and a plurality of linear patterns connected in between each two of the plurality of the geometrical patterns on the upper boundary, wherein each of the geometrical patterns and linear patterns are formed of retro-reflective markers;
- providing a map installed in a memory unit disposed in the autonomous vehicle, wherein the map includes position info of the geometrical patterns and the linear patterns;
- emitting light from a light source disposed on the autonomous vehicle toward at least one of the geometrical patterns and at least one of the linear patterns;
- capturing a target image frame including the upper boundary, the at least one of the geometrical patterns, and the at least one of the linear patterns lightened by the light emitted from the light source by an image capturing device installed in the autonomous vehicle;
- turning off the light source and capturing a background image frame including the upper boundary, the at least one of the geometrical patterns, and the at least one of the linear patterns not lightened by the light emitted from the light source by the image capturing device;
- aligning the target image frame and the background image frame by a digital image processor installed in the autonomous vehicle;
- subtracting the target image frame and the background image frame for extracting a foreground image indicating the at least one of the geometrical patterns and the at least one of the linear patterns by the digital image processor; and
- determining the position of the autonomous vehicle by comparing the at least one of the geometrical patterns and the at least one of the linear patterns to the position info of the map by a central processor.

20. The indoor positioning method as claimed in claim 19, further comprising: determining a signal-to-noise ratio of the foreground image by the image capturing device, and when the signal-to-noise ratio is lower than a predetermined threshold, re-capturing the target image frame and the background image frame.

* * * * *